United States Patent [19]

Vendramini

[11] 4,026,553
[45] May 31, 1977

[54] RACKET FOR TENNIS, BADMINTON, SQUASH OR THE LIKE

[76] Inventor: Dante Vendramini, 17, rue Jean Dussourd, Asnieres, France, 92600

[22] Filed: Mar. 6, 1975

[21] Appl. No.: 556,162

[30] Foreign Application Priority Data

Mar. 11, 1974 France .............................. 74.08201

[52] U.S. Cl. ............................ 273/73 E; 273/73 D
[51] Int. Cl.² ......................................... A63B 51/12
[58] Field of Search ............ 273/26 A, 58 C, 67 R, 273/73 R, 73 C, 73 D, 73 E, 95 A, 96 D; 124/20, 30 A; 245/5; 66/195; 36/122

[56] References Cited

UNITED STATES PATENTS

| 1,558,507 | 10/1925 | Ryder ................... 273/73 E |
| 2,081,059 | 5/1937 | Mitchell ................ 273/58 C X |
| 2,769,439 | 11/1956 | Layer .................... 124/30 A |
| 2,847,790 | 8/1958 | Tjernagel ............... 273/73 D X |
| 2,969,984 | 1/1961 | Presnick ................ 273/73 R |
| 3,644,168 | 2/1972 | Bonk et al. ............. 273/73 F X |
| 3,702,702 | 11/1972 | Hoult .................... 273/96 D |
| 3,711,092 | 1/1973 | Hogue ................... 273/73 D X |
| 3,724,850 | 4/1973 | Stevens ................. 273/73 E |
| 3,729,194 | 4/1973 | Barnett ................. 273/95 A X |
| 3,822,062 | 7/1974 | Tucker et al. .......... 273/96 D |
| 3,966,207 | 6/1976 | Pass ..................... 273/73 D |

FOREIGN PATENTS OR APPLICATIONS

| 1,168,573 | 9/1958 | France ........................... 273/73 K |
| 1,503,812 | 10/1967 | France ........................... 273/73 C |
| 1,089,675 | 10/1956 | Germany ......................... 273/73 C |
| 3,127 | 3/1885 | United Kingdom ............ 273/73 D |
| 269,092 | 4/1927 | United Kingdom ............ 273/73 E |
| 731,483 | 6/1955 | United Kingdom ............ 273/73 K |

*Primary Examiner*—Richard J. Apley
*Attorney, Agent, or Firm*—Kane, Dalsimer, Kane, Sullivan and Kurucz

[57] ABSTRACT

A racket for tennis, badminton, squash or the like. The racket has a generally conventional oval frame with a handle. A one-piece molded plastic meshed netting is provided with oval strands parallel to the oval frame and radiating strands intersecting and bracing the oval strands. Thickened ends of the radiating strands pass through holes in the frame where they are secured either by a belting strand passing through loops at the ends of the radiating strands or by merely passing through the loops of adjacent radiating strands. The belting strand and other pairs of radiating strands are hooked onto one of two pins each in a tube in the handle. The tubes are adjustable axially by a screwthreaded plug and a screw at the butt end of the handle, each cooperating with one of the tubes for adjusting the tension of the netting.

7 Claims, 12 Drawing Figures

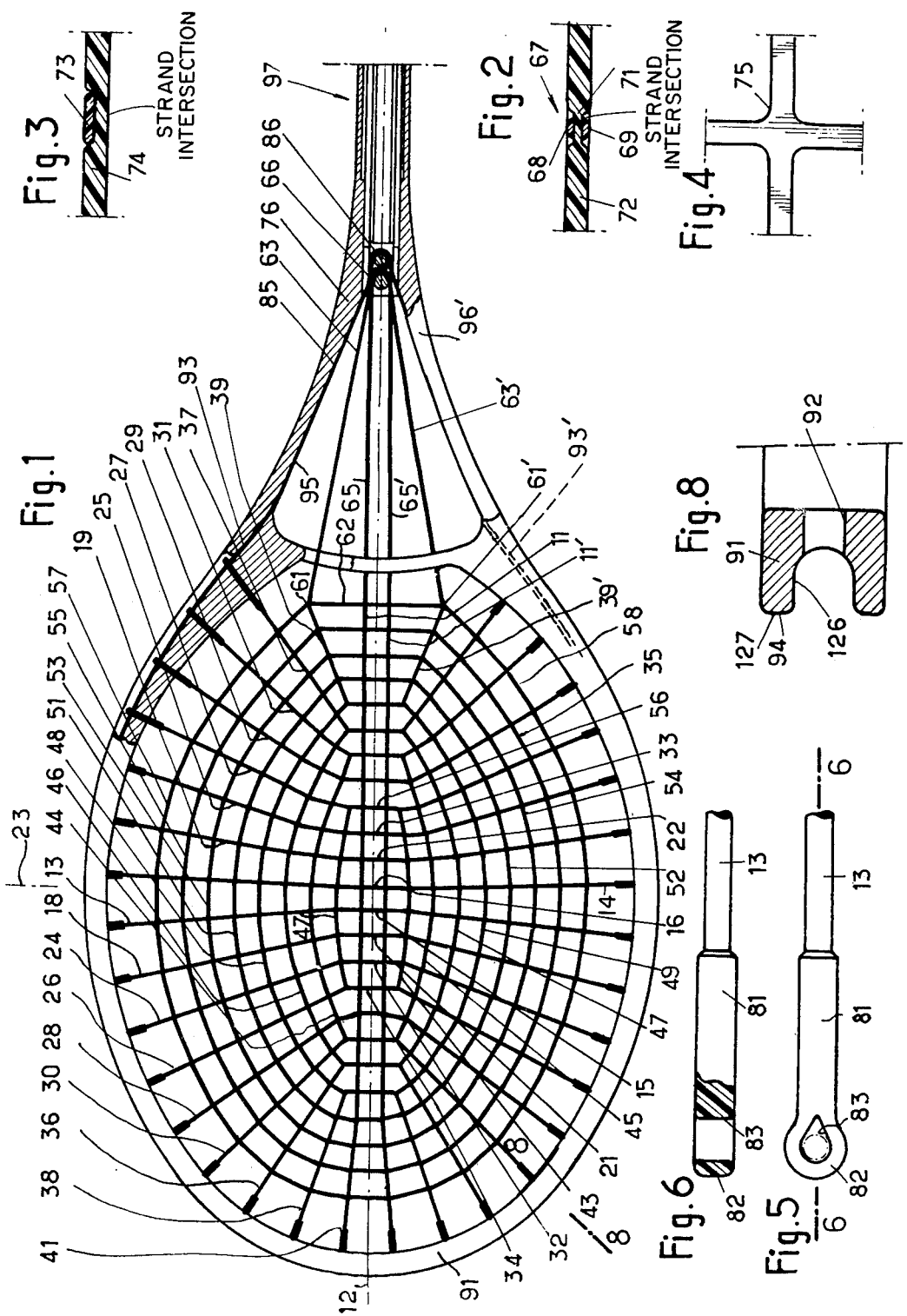

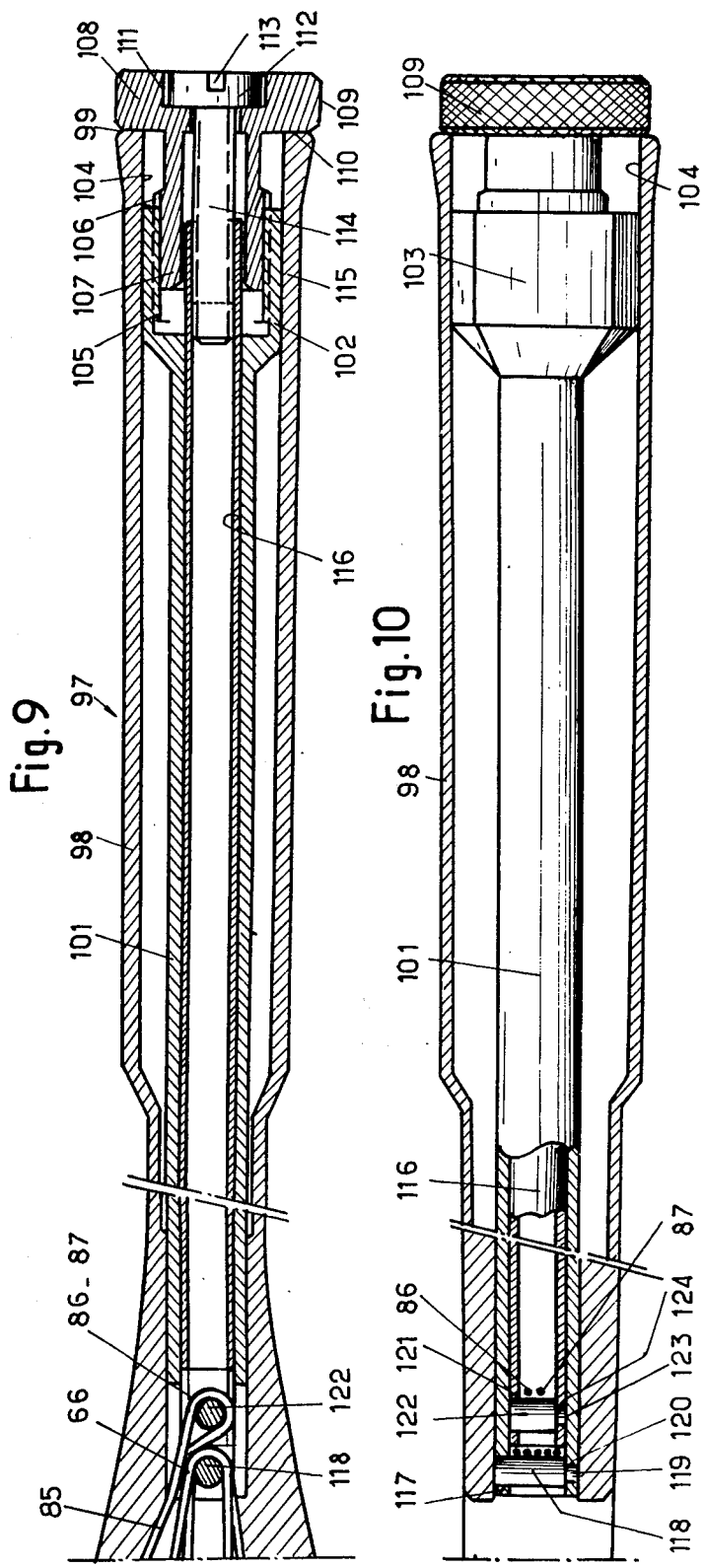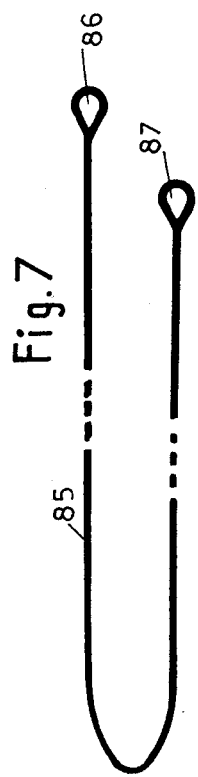

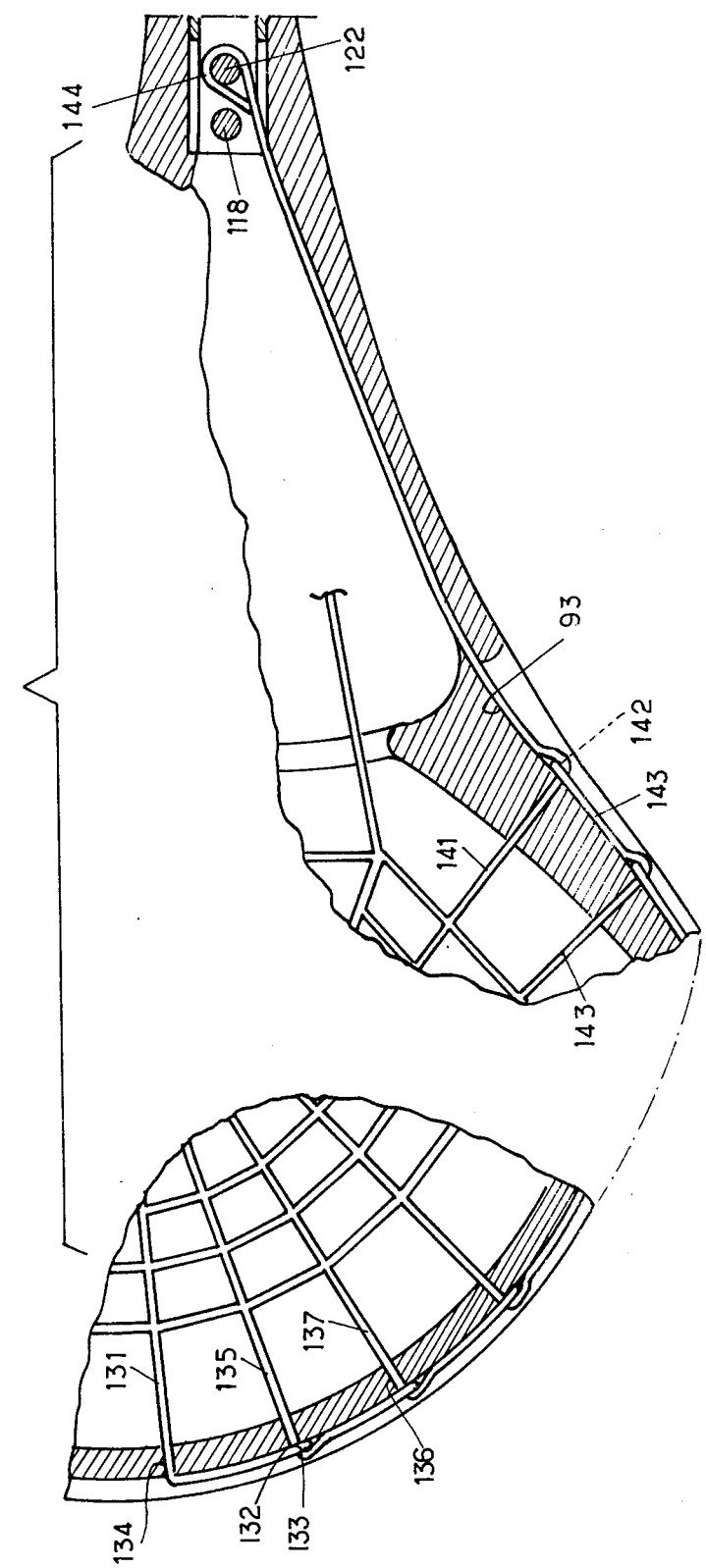

RACKET FOR TENNIS, BADMINTON, SQUASH OR THE LIKE

The present invention relates to rackets, e.g., tennis rackets, squash rackets and badminton rackets.

Tennis rackets have already been proposed, according to French Patent No. 1,168,573, comprising a striking surface formed of a grid of molded plastic material, instead of the conventional netting of interwoven catgut including vertical strands parallel to the handle of the racket and horizontal or cross strands.

Such rackets have frames also of molded plastic material to which the molded netting is fastened but do not give total satisfaction in view of their own peculiarities which restrict their use.

The racket according to the invention which comprises a molded plastic meshed netting member supported by a frame is characterized in that said netting comprises free peripheral strands having reinforced end portions adapted to pass through holes in the frame for fastening the netting member thereto. The description which follows, given by way of example, makes reference to the accompanying drawings, in which:

FIG. 1 shows a partial elevational view, with a cutaway section of a racket according to the invention;

FIG. 2 shows a detail view in sections and on an enlarged scale;

FIG. 3 shows a view similar to that of FIG. 2 for a variation;

FIG. 4 shows another detail view on an enlarged scale;

FIG. 5 shows a partial view on an enlarged scale of the end of a strand;

FIG. 6 shows a cross-sectional view taken on line 6—6 in FIG. 5;

FIG. 7 shows a view of a belting strand;

FIG. 8 shows a sectional view on an enlarged scale taken on line 8—8 in FIG. 1;

FIG. 9 shows a sectional vew of the handle of the racket;

FIG. 10 shows a sectional view taken at right-angles to sectional view of FIG. 9;

FIG. 11 shows a partial view of an alternative embodiment of the racket; and

FIG. 12 shows a fragmentary end view of the alternative embodiment of the racket.

The striking surface or netting of a racket according to the invention ressembles a grid network or a spider's web with vertical strands 11, 11' disposed symmetrically to each side of vertical axis 12 and central transverse strands 13 and 14 having parallel portions 15 and 16 between strands 11 and 11' and diverging thereafter. The following strands 18 and 19 have the same general arrangement, that is, portions 21 and 22 perpendicular to the strands 11 and 11' are followed by portions diverging slightly more so than those of strands 13 and 14. The farther removed of strand is from the mean transverse plane 23, the greater is the divergence. The strands 24, 25, 26 and 27 have central portions 32, 33, 34 and 35 perpendicular to vertical strands 11 and 11' and longer than the central portions 15 and 16 of central cross strands 13 and 14. This is likewise the case for other central portions, for example, strands 30 and 31. Thus, in view of the increasing angle made by the strands relative to the mean transverse plane, the last such strand 38 makes only a very small angle with the vertical strand 11 whose upper or outer end portion 41 is moreover slightly divergent too.

Horizontal portions 15, 16, 21, 22, 34, 35, etc. are the starting points for so-called concave strands formed by a series of straight-line segments with a generally curved overall configuration. Moreover, these so-called concave strands are symmetrical with respect to the mean vertical plane 12 and consist of symmetrical strand pairs 42 and 43, 44 and 45, 46 and 47, 48 and 49, 51 and 52, 53 and 54, 55 and 56, 57 and 58 arranged generally parallel to one another and forming substantially parallel oval contours.

Radiating strands 38, 36, 30, 28, 26, 24, 18, 13, 14, 19, 25, 27, 29, 31, 37 protrude beyond the outermost oval contour formed by strands 57 and 58. Strand 39 and its symmetrical strand 39' do not protrude beyond the intersections 61 and 61' of strands 57 and 58 with the lower horizontal strand 62. The intersections 61 and 61' are at the ends of strands 63 and 63' which are joined to each other by an interconnecting curved portion 64. The extensions 65 and 65' of strands 11 and 11' are joined to each other by a curved portion 66.

The entire netting or grid network is molded, preferably under pressure, from plastic material which may be reinforced with reinforcing fibers, which by way of nonlimiting example, may be glass fibers.

During manufacture, the fibers of a strand 67 are divided into two layers 68 and 69 straddling a portion 71 of the fibers of an intersecting strand 72 (FIG. 2).

Alternatively, the intersection of strands may be as shown in FIG. 3 in which the fibers of a strand 73 are disposed on only one side of the intersecting strand 74.

In each case, the actual intersection of two strands is flat, i.e., there is no substantial increase in thickness, the material extruded during pressure molding having fillets at the junction of intersecting strands in the general plane of the grid network (see FIG. 4).

Each one of the radiating strands 13, 14, 18, 19, etc. has a thickened end portion 81, preferably of circular cross section, with a loop 82 at the outer end thereof defining an opening 83 (FIGS. 5 and 6).

The grid network or netting is thus a single mechanical unit or member which is easily stored and which may be sold, for example, in a bag to and later positioned on a racket. The netting is accompanied with a belting strand 85 having end loops 86 and 87 (FIG. 7).

The frame of the racket has holes 92 (FIG. 8) corresponding to the radiating strands of the netting; the number of holes may be approximately half as many as normally provided for stringing traditional netting. The frame itself may be of the usual type employed with traditional netting. The oblique passages 93 and 93' open at one end onto the outer peripheral surface 94 of the frame and at the other end onto an interior surface 95 of the arms 96 and 96' which branch from the tubular handle 97.

The handle itself has a grip portion 98 of the usual polygonal cross section and a free end surface 99 (FIG. 9). A first tube 101 is disposed inside the handle 97 and has a flared lower end including a sleeve portion 102 whose outer surface 103 mates with the inner polygonal surface 104 of the handle 97. The interior of the sleeve portion 102 has a threaded surface 105 which threadedly engages the screwthread 106 of the socket 107 which is part of the plug 108 having a knurled outer surface 109. The undersurface 110 of the shoulder formed by the head of the plug is adapted to come into abutment with the butt end surface 99 of the handle 97. The outer surface of the head of the plug 108 has a central recess 111 for the head of a screw 112 with a slot 113 for receiving the tip of a screwdriver, the threaded shank 114 threadedly engages the threaded end portion 115 of a second tube 116 housed inside the first tube 101. The opposite or upper end of the tube 101 has a hole 117 for a pin 118 having an end of reduced cross section received in a smaller hole 120 diametrically opposite the hole 117. Likewise, the other or upper end of the second tube 116 (FIG. 10) has a hole 121 for a pin 122 having an end 123 of reduced cross section received in a hole 124 diametrically opposite the hole 121.

Initially, the plug 108 and the head of the screw 112 are loosened so that the pins 118 and 122 are accessible.

In order to mount the netting on the frame, the end portions 81 of the radiating strands are pushed through corresponding holes in the frame, and the loop 86 at one end of the belting strand 85 is hooked onto the pin 122. Thereafter, the other end of the belting strand 85 is passed through the passage 93 and then through the loop 82 at the end of a first radiating strand 37, the loop 82 at the end of a second radiating strand 31, and so on, until the belting strand 82 has been passed successively through all the loops 82. The belting strand 85 is then passed through the passage 93' after which the loop 87 at the free end of the belting loop is also hooked on the pin 122. The curved interconnecting portions 64 and 66 of the strands 63, 63' and 65, 65' are then looked onto pin 118. Thereafter, the plug 108 and the screw 112 are both tightened to give the netting the desired tension, the tensioning force being transmitted through the belting strand 85 and the strands 63, 63' and 65, 65'.

The tension of the netting can be adjusted later on by the player in order to obtain the desired striking force.

After using the racket, the tension initially applied to the netting is advantageously relieved thereby avoiding any unnecessary fatiguing of the racket when not in use.

Reference will now be made to FIGS. 11 and 12. In this embodiment, each of the radiating strands 131 have at its end a loop 132 forming an opening 133. The length of each strand is such that when it passes through the corresponding hole 134 in the frame it extends beyond the frame a distance such that when it is folded along in the peripheral channel 126, the opening 133 is opposite the next adjacent hole in the frame. Thus, when the next adjacent strand 135 is passed through the next adjacent hole, the strand 135 also passes through the opening 133 of the first strand 131. The strand 135 therefore retains the strand 131. In a similar manner, the next strand 137 is passed through the opening 138 in the loop on the strand 135 and folded over along the peripheral channel in the frame thereby maintaining the strand 135, and so on.

The last radiating strand 141 passes through the loop 142 of the preceding strand and is long enough to extend through the passage 93; the loop 144 at the end of the strand 141 is then hooked onto the pin 122. This is also the case for the symmetric strand on the other side. The tensioning of the netting in this embodiment is carried out in exactly the same way as described above and so is the relieving of tension after the racket has been used in order to prevent any unnecessary fatiguing of the racket when it is not in use.

I claim:

1. A netting member for tennis or badminton rackets of the type having a grooved frame with holes extending therethrough from the interior to the exterior of the frame, comprising; a network consisting of plastic material which is reinforced with glass fibers and comprises at its periphery strands with free end portions of substantially circular cross section and distributed in the same way as the holes of the frame, each strand having at its free end a loop and the length of the strands being such that, after threading through the respective holes, the loops extend from the respective holes exteriorly of the frame.

2. A netting member for tennis or badminton rackets according to claim 1 wherein the network comprises longitudinally extending median elements and substantially oval parallel elements extending from radial elements extending transversely from the longitudinal median elements and looped strands extending radially from the oval elements.

3. A netting member for tennis or badminton rackets according to claim 2, wherein a handle extends from one end of the frame and is joined therewith, the longitudinal elements extending away from the joint between the frame and the handle of the racket and having a length sufficient to allow for their anchoring, external traction means for anchoring the longitudinal elements at the striking surface of the racket so as to constitute the tensioned netting member.

4. The invention in accordance with claim 3 wherein two coupling elements are mounted on the butt end of the handle for interengagement with the longitudinal strands as well as for tensioning of such strands.

5. A netting member for tennis or badminton rackets of the type having a frame withholes extending from the interior to the exterior thereof, comprising; a one-piece network consisting of elements in the form of strips which intersect each other to form substantially rectangular interstices save for the marginal strands which extend radially and have free end portions, the strands being disposed radially and in such a way that, when the network is mounted in the interior of the frame, the free end portions, which have a substantially circular cross section, are in register with the holes of the frame, the free end portions of the strands terminating in loops and being of such length that after threading through the holes of the frame, the loops project from the frame.

6. The invention in accordance with claim 5 wherein the intersection of two overlapping elements is formed by placing the fibers of one element on both sides of the fibers of the other element at the region of intersection therebetween, the thickness of the region of intersection being the same as that of the elements adjacent to the region of intersection.

7. The invention in accordance with claim 6 wherein an intersection between two elements comprises an overlapping zone between the two elements wherein the thickness of the zone is formed by a reduced thickness portion of one of the elements and a reduced thickness portion of the other of the elements where they overlap so that the resulting zone of intersection has a combined thickness equal to the thickness of the elements adjacent to the zone of intersection.

* * * * *